United States Patent
Simon

(10) Patent No.: US 10,670,292 B2
(45) Date of Patent: Jun. 2, 2020

(54) FLUID PRESSURE CALIBRATION IN CLIMATE CONTROL SYSTEM

(71) Applicant: Carrier Corporation, Palm Beach Gardens, FL (US)

(72) Inventor: Emile Simon, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 86 days.

(21) Appl. No.: 16/081,362

(22) PCT Filed: Mar. 1, 2017

(86) PCT No.: PCT/US2017/020184
§ 371 (c)(1),
(2) Date: Aug. 30, 2018

(87) PCT Pub. No.: WO2017/151758
PCT Pub. Date: Sep. 8, 2017

(65) Prior Publication Data
US 2019/0086112 A1   Mar. 21, 2019

Related U.S. Application Data

(60) Provisional application No. 62/303,109, filed on Mar. 3, 2016.

(51) Int. Cl.
*F24F 11/46* (2018.01)
*F24F 3/06* (2006.01)
(Continued)

(52) U.S. Cl.
CPC .............. *F24F 11/46* (2018.01); *F24F 3/065* (2013.01); *F24F 11/30* (2018.01); *F24F 11/49* (2018.01);
(Continued)

(58) Field of Classification Search
CPC .. F24F 11/46; F24F 11/30; F24F 11/49; F24F 3/06; G05B 19/042
See application file for complete search history.

(56) References Cited

U.S. PATENT DOCUMENTS 5,600,960 A    2/1997   Schwedler et al.
5,782,101 A    7/1998   Dennis
(Continued)

FOREIGN PATENT DOCUMENTS

CN    102620143 A    8/2012
CN    203771795 U    8/2014
(Continued)

OTHER PUBLICATIONS

Architectural Services Department the Government of the Hong Kong Specialadministrative Region, "Testing and Commissioning Procedure for Air-Conditioning, Refrigeration, Ventilation and Centralmonitoring& Control System Installation in Government Buildings of the Hong Kong Specialadministrative Region", 2007 Edition, 245 pages.
(Continued)

*Primary Examiner* — Vincent H Tran
(74) *Attorney, Agent, or Firm* — Cantor Colburn LLP

(57) ABSTRACT

A method for selecting a fluid pressure of a fluid supplied to a plurality of terminal units in a climate control system includes adjusting the fluid pressure over a range over fluid pressures; determining a terminal unit efficiency for each terminal unit over the range of fluid pressures; determining a range of combined terminal unit efficiencies over the range of fluid pressures; identifying a range of bottom terminal unit efficiencies over the range of fluid pressures; and selecting a selected fluid pressure at which (i) a combined terminal unit efficiency is within a first threshold of a combined terminal unit efficiency limit and/or (ii) a bottom
(Continued)

terminal unit efficiency is within a second threshold of a bottom terminal unit efficiency limit.

18 Claims, 3 Drawing Sheets

(51) Int. Cl.
| | |
|---|---|
| F24F 11/30 | (2018.01) |
| F24F 11/62 | (2018.01) |
| F24F 11/64 | (2018.01) |
| F24F 11/83 | (2018.01) |
| F24F 11/85 | (2018.01) |
| F24F 11/49 | (2018.01) |
| F24F 11/65 | (2018.01) |
| F24F 11/56 | (2018.01) |
| G05B 19/042 | (2006.01) |
| F24F 11/63 | (2018.01) |
| F24F 140/60 | (2018.01) |
| F24F 140/50 | (2018.01) |
| F24F 110/10 | (2018.01) |

(52) U.S. Cl.
CPC .............. *F24F 11/56* (2018.01); *F24F 11/62* (2018.01); *F24F 11/64* (2018.01); *F24F 11/65* (2018.01); *F24F 11/83* (2018.01); *F24F 11/85* (2018.01); *G05B 19/042* (2013.01); *F24F 11/63* (2018.01); *F24F 2110/10* (2018.01); *F24F 2140/50* (2018.01); *F24F 2140/60* (2018.01); *G05B 2219/2614* (2013.01)

(56) References Cited

U.S. PATENT DOCUMENTS

| | | | |
|---|---|---|---|
| 5,963,458 A | 10/1999 | Cascia | |
| 6,134,511 A | 10/2000 | Subbarao | |
| 6,185,946 B1 | 2/2001 | Hartman | |
| 6,449,969 B1 | 9/2002 | Fujimoto et al. | |
| 6,718,779 B1 | 4/2004 | Henry | |
| 6,973,410 B2 | 12/2005 | Seigel | |
| 8,700,221 B2 | 4/2014 | Cheng et al. | |
| 8,774,978 B2 | 7/2014 | Higgins et al. | |
| 8,897,921 B2 | 11/2014 | Dempster et al. | |
| 9,002,532 B2 | 4/2015 | Asmus | |
| 9,032,748 B2 | 5/2015 | Lau et al. | |
| 2011/0218771 A1* | 9/2011 | Seigel | F24F 11/30 702/182 |
| 2012/0273581 A1 | 11/2012 | Kolk et al. | |
| 2013/0035794 A1 | 2/2013 | Imani | |
| 2013/0125565 A1 | 5/2013 | Erpelding et al. | |
| 2014/0287671 A1* | 9/2014 | Slessman | F28F 9/0265 454/184 |
| 2014/0316583 A1* | 10/2014 | Ambriz | F24F 11/30 700/277 |
| 2014/0345307 A1* | 11/2014 | Bagley | F25B 49/02 62/115 |
| 2015/0027156 A1 | 1/2015 | Bellamy, Jr. | |
| 2015/0178865 A1 | 6/2015 | Anderson et al. | |
| 2015/0337849 A1 | 11/2015 | Lundh et al. | |
| 2016/0010639 A1 | 1/2016 | Cheng et al. | |
| 2016/0113154 A1* | 4/2016 | Liu | H05K 7/207 165/244 |
| 2017/0292763 A1* | 10/2017 | Douglas | F25D 17/045 |

FOREIGN PATENT DOCUMENTS

| | | |
|---|---|---|
| CN | 105247302 A | 1/2016 |
| EP | 1818627 A1 | 8/2007 |
| WO | 2013019537 A2 | 2/2013 |

OTHER PUBLICATIONS

International Search Report and Written Opinion for PCT/US2017/020184, dated May 26, 2017, 12 pages.

* cited by examiner

FLUID PRESSURE CALIBRATION IN CLIMATE CONTROL SYSTEM

BACKGROUND

Embodiments relate generally to climate control systems, and more particularly to fluid pressure calibration in a climate control system.

Existing climate control systems circulate a fluid to a number of terminal units to condition air supplied to spaces associated with the terminal units. When the climate control system is commissioned, a fluid pressure is selected so that the terminal units receive sufficient fluid to meet the demands of the spaces. Existing commissioning processes lead to conservatively high fluid pressures. This ensures that the behavior of any terminal unit is never compromised, but on the other hand excessive energy is used to produce that excessive pressure. This also implies unnecessary wear and tear on the fluid loop components (in particular pumps used to circulate the fluid).

SUMMARY

According to one embodiment, a method for selecting a fluid pressure of a fluid supplied to a plurality of terminal units in a climate control system includes adjusting the fluid pressure over a range over fluid pressures; determining a range of terminal unit efficiencies for each terminal unit over the range of fluid pressures; determining a range of combined terminal unit efficiencies over the range of fluid pressures; identifying a range of bottom terminal unit efficiencies over the range of fluid pressures; and selecting a selected fluid pressure at which at least one of (i) the combined terminal unit efficiency is within a first threshold of a combined terminal unit efficiency limit and (ii) the bottom terminal unit efficiency is within a second threshold of a bottom terminal unit efficiency limit.

In addition to one or more of the features described above, or as an alternative, further embodiments may include wherein the first threshold and second threshold are equal.

In addition to one or more of the features described above, or as an alternative, further embodiments may include wherein the combined terminal unit efficiency limit corresponds to the combined terminal unit efficiency at an other pressure.

In addition to one or more of the features described above, or as an alternative, further embodiments may include wherein the other pressure is a maximum fluid pressure for the climate control system.

In addition to one or more of the features described above, or as an alternative, further embodiments may include wherein the bottom terminal unit efficiency limit corresponds to the bottom terminal unit efficiency at the other pressure.

In addition to one or more of the features described above, or as an alternative, further embodiments may include wherein the other pressure is a maximum fluid pressure for the climate control system.

In addition to one or more of the features described above, or as an alternative, further embodiments may include wherein the combined terminal unit efficiency is determined by averaging terminal unit efficiencies of the plurality of terminal units yielding a range of combined terminal unit efficiencies over the range of fluid pressures.

In addition to one or more of the features described above, or as an alternative, further embodiments may include wherein the bottom terminal unit efficiency is associated with the lowest performing terminal unit.

In addition to one or more of the features described above, or as an alternative, further embodiments may include wherein the selecting comprises selecting the selected fluid pressure at which both (i) the combined terminal unit efficiency is within a first threshold of a combined terminal unit efficiency limit and (ii) the bottom terminal unit efficiency is within a second threshold of a bottom terminal unit efficiency limit.

According to another embodiment, a climate control system includes a conditioning system having a heat exchanger; a terminal unit system including a pump or a plurality of pumps for circulating a fluid through the heat exchanger and to a plurality of terminal units; and a controller configured to select a fluid pressure of the fluid supplied to the plurality of terminal units, the controller configured to execute operations including: adjusting the fluid pressure over a range over fluid pressures; determining a range of terminal unit efficiencies for each terminal unit over the range of fluid pressures; determining a range of combined terminal unit efficiencies over the range of fluid pressures; identifying a range of bottom terminal unit efficiencies over the range of fluid pressures; and selecting a selected fluid pressure at which at least one of (i) the combined terminal unit efficiency is within a first threshold of a combined terminal unit efficiency limit and (ii) the bottom terminal unit efficiency is within a second threshold of a bottom terminal unit efficiency limit.

In addition to one or more of the features described above, or as an alternative, further embodiments may include wherein the first threshold and second threshold are equal.

In addition to one or more of the features described above, or as an alternative, further embodiments may include wherein the combined terminal unit efficiency limit corresponds to the combined terminal unit efficiency at an other pressure.

In addition to one or more of the features described above, or as an alternative, further embodiments may include wherein the other pressure is a maximum fluid pressure for the climate control system.

In addition to one or more of the features described above, or as an alternative, further embodiments may include wherein the bottom terminal unit efficiency limit corresponds to the bottom terminal unit efficiency at the other pressure.

In addition to one or more of the features described above, or as an alternative, further embodiments may include wherein the other pressure is a maximum fluid pressure for the climate control system.

In addition to one or more of the features described above, or as an alternative, further embodiments may include wherein the combined terminal unit efficiency is determined by averaging terminal unit efficiencies of the plurality of terminal units yielding a range of combined terminal unit efficiencies over the range of fluid pressures.

In addition to one or more of the features described above, or as an alternative, further embodiments may include wherein the bottom terminal unit efficiency is associated with the lowest performing terminal unit.

In addition to one or more of the features described above, or as an alternative, further embodiments may include wherein the selecting comprises selecting the selected fluid pressure at which both (i) the combined terminal unit efficiency is within a first threshold of a combined terminal unit efficiency limit and (ii) the bottom terminal unit efficiency is within a second threshold of a bottom terminal unit efficiency limit.

Technical effects of embodiments of the disclosure include the ability to determine a fluid pressure for a terminal unit system that meets efficiency goals without unduly burdening system components, such as pumps, terminal unit coils, etc.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments, together with advantages and features, by way of example with reference to the drawings.

DETAILED DESCRIPTION

Figure 1:
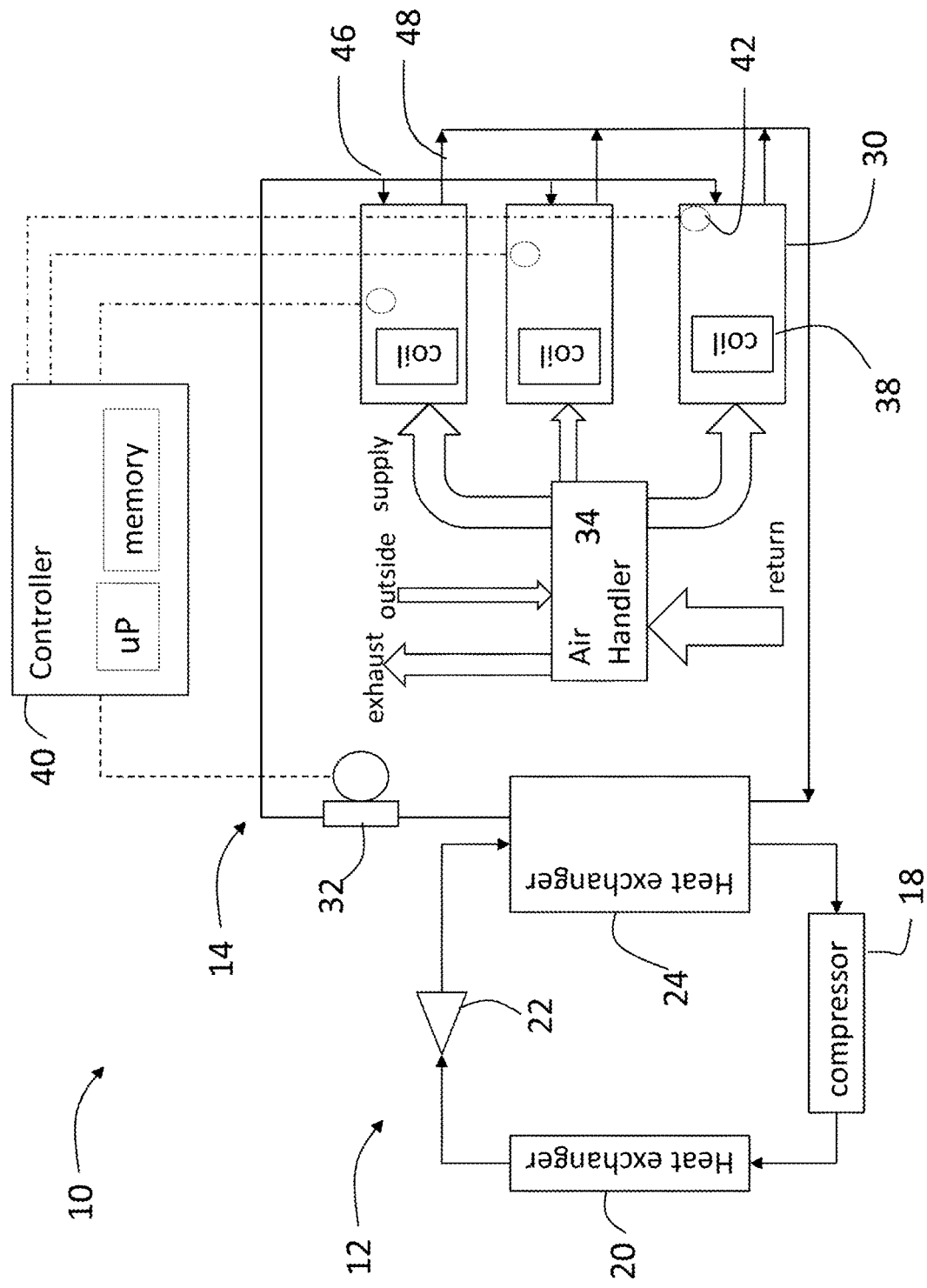
FIG. 1 depicts a climate control system in an exemplary embodiment.

FIG. 1 depicts a climate control system 10 in an exemplary embodiment. The climate control system 10 includes a conditioning system 12 and a terminal unit system 14. The conditioning system 12 includes a compressor 18, first heat exchanger 20 (e.g., condenser/gas cooler), an expansion valve 22 and a second heat exchanger 24 (e.g., an evaporator). In operation in a cooling mode, gaseous refrigerant is induced into compressor 18 and compressed. After the refrigerant is compressed, the high temperature, high pressure refrigerant gas is supplied to condenser 20. In condenser 20, the gaseous refrigerant condenses into liquid as it gives up heat to another fluid (e.g., air). The liquid refrigerant passes through expansion valve 22 to reduce pressure and then flows to evaporator 24. In the evaporator 24, the refrigerant changes state to a gas and absorbs heat from a fluid (e.g., water) passing through evaporator 24. The fluid is circulated in the terminal unit system 14 as described in further detail herein. The low pressure vapor is then drawn into the inlet of compressor 18 and the cycle is continually repeated.

Although the conditioning system 12 is shown as cooling fluid circulated in the terminal unit system 14, the conditioning system 12 may also heat fluid circulated in the terminal unit system 14. A reversing valve may be used to reverse the flow of refrigerant in the conditioning system such that heat exchanger 24 heats fluid circulated in the terminal unit system 14. The conditioning system 12 is not limited to using refrigerant compression systems, but may utilize other techniques (e.g., free cooling, thermoelectric, gas boiler, etc.) to condition fluid circulated in the terminal unit system 14.

The terminal unit system 14 includes a plurality of terminal units 30, each of which supplies conditioned air to a space, such as a building floor, room, etc. Each terminal unit 30 may serve a separate space, or multiple terminal units 30 may supply a single space. Fluid is circulated to and from the terminal units 30 by one or more pumps 32. An air handler 34 provides supply air to each terminal unit 30. As known in the art, the air handler 34 receives return air (a portion or all of which may be expelled as exhaust air) and outside air to form the supply air stream. Each terminal unit 30 includes a coil 38 that receives fluid from pump(s) 32 at a coil inlet 46 and expels fluid at a coil outlet 48. Fluid from the coil outlets 48 is returned to the heat exchanger 24 for conditioning. Supply air flows over the coils 38 to provide a conditioned supply air to each space.

A supervisory controller 40 monitors each terminal unit 30 via one or more terminal unit(s) controller(s) or thermostat(s) and connected sensors 42 located at each terminal unit 30. The thermostat(s)-sensors 42 generate sensor signals that are provided to the supervisory controller 40. The sensors 42 may provide a measure of discharge air temperature at each respective terminal unit 30, as well as a measure of the room ambient temperature or return air temperature. The sensors may also provide a measure of fluid temperature at the coil 38 at each respective terminal unit 30. Multiple sensors 42 may be employed at each terminal unit 30 to measure a variety of parameters such as air temperature, fluid temperature, fluid pressure, airflow volume, etc. The supervisory controller 40 is also in communication with pump(s) 32. The supervisory controller 40 may monitor current pump speed and/or fluid pressure. The supervisory controller 40 can also send control signals to the pump(s) 32 to control the pump speed and/or the fluid pressure.

The supervisory controller 40 may include a processor and an associated memory. The processor may be but is not limited to a single-processor or multi-processor system of any of a wide array of possible architectures, including field programmable gate array (FPGA), central processing unit (CPU), application specific integrated circuits (ASIC) or digital signal processor (DSP) hardware arranged homogenously or heterogeneously. The memory may be, but is not limited to, a random access memory (RAM), read only memory (ROM), or other electronic, optical, magnetic or any other computer readable medium.

In operation, fluid in the terminal unit system 14 is conditioned (e.g., cooled or heated) at the heat exchanger 24. The pump(s) 32 circulate(s) the fluid to the coils 38 at coil inlets 46. Supply air from the air handler 34 passes over the coils 38 to provide conditioned air to the respective spaces. Once the fluid passes through a coil 38, it emerges at the coil outlet 48 and is returned to the heat exchanger 24 for further conditioning.

As noted above, existing terminal unit systems often use a fluid pressure that is higher than necessary. This results in unnecessary wear on pump(s) 32. Coils 38 and heat exchanger 24 also need to withstand higher pressures than needed. Embodiments of the disclosure select a fluid pressure for the terminal unit system 14 that meets desired air conditioning efficiency requirements while not placing undue stress on system components, nor consuming unnecessary energy to do so.

Figure 2:
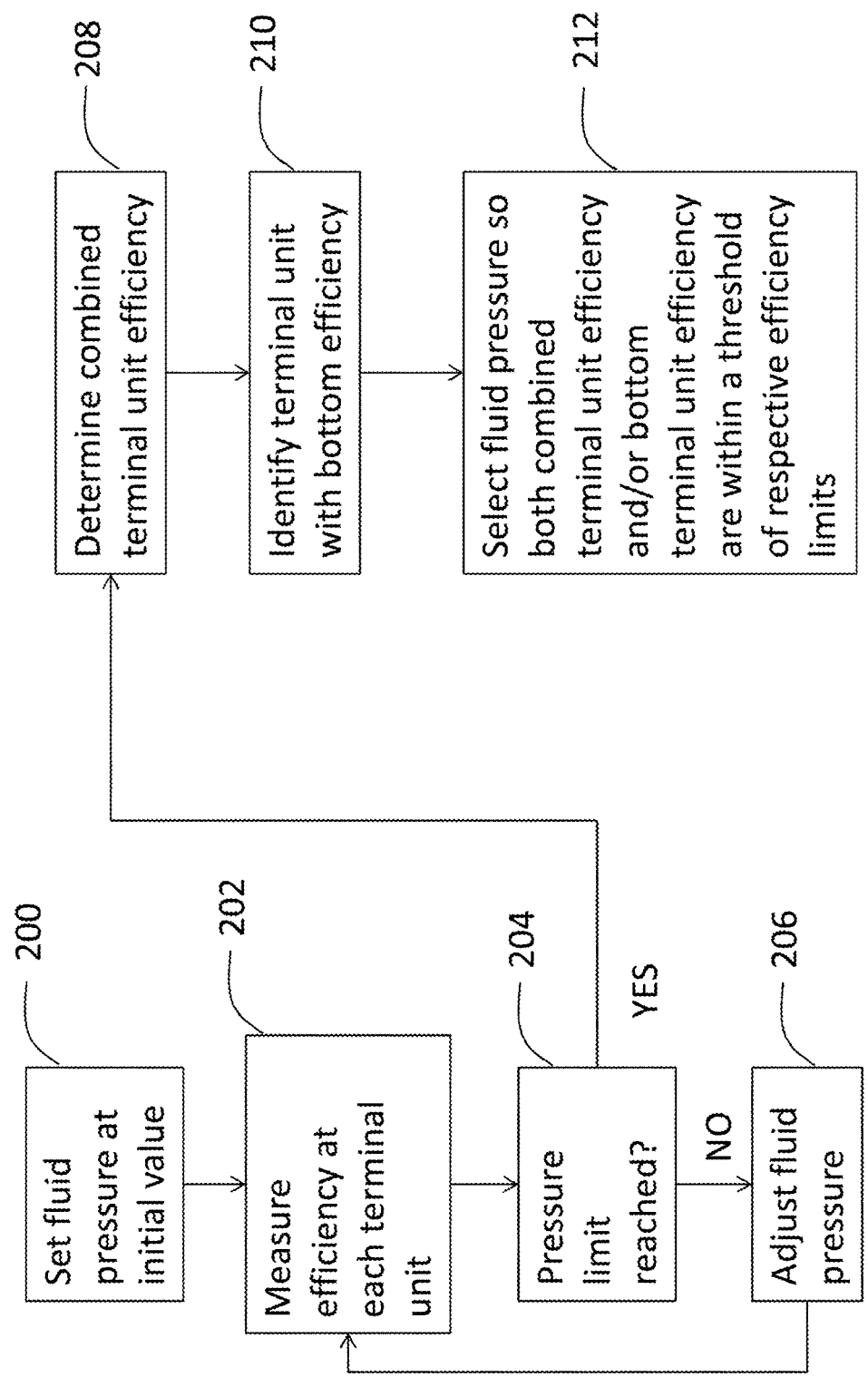
FIG. 2 depicts a flowchart of a process for fluid pressure calibration in an exemplary embodiment.

FIG. 2 depicts a flowchart of a process for fluid pressure calibration in an exemplary embodiment. The process of FIG. 2 may be performed only once during commissioning of the climate control system 10. However, the process may be performed periodically as well in order to maintain the efficiency of the climate control system 10 (e.g. every 6 months). Furthermore, this process may be fully or partially automated (i.e., no human intervention required in the former case). The process begins at 200 where the controller 40 sets the fluid pressure in the terminal unit system 14 to an initial value. For example, the controller 40 may command the pump(s) 32 to provide 10% of the maximum fluid pressure. The fluid pressure may also be represented in physical quantities (e.g., PSI, Pascal). Alternatively, the controller 40 may command the pump(s) 32 to provide 100% of the maximum fluid pressure.

At 202, the controller 40 measures the efficiency of each of the terminal units 30 at the current fluid pressure. The efficiency at each terminal unit 30 may be measured as a function of a parameter or parameters sensed by the sensor(s) 42 at each terminal unit 30. For example, the discharge air temperature at each terminal unit 30 provides an indication of efficiency. The measured discharge air temperature at a terminal unit 30 can be compared to an expected discharge air temperature (either coldest or hottest depending on mode) at the current fluid pressure to derive an efficiency for that terminal unit 30. The expected discharge air temperature may be derived from system operating conditions (room temperature, return air temperature, fluid pressure, fluid temperature, distances to each terminal unit, etc.). As an example, a terminal unit 30 generating discharge air at a temperature of 18° C. versus an expected discharge air temperature of 16° C., would have an efficiency of 88% (in a cooling mode).

In another embodiment, the efficiency of each terminal unit 30 may be represented as a difference between a discharge parameter of a terminal unit relative to the discharge parameter of the most efficient terminal unit. For example, at a certain fluid pressure (e.g., 50%), the most efficient terminal unit may produce a discharge air temperature of 16° C. and be considered 100% efficient at that fluid pressure. The discharge air temperature of the other terminal units is compared to 16° C. to obtain relative efficiency. In this example, a terminal unit with a discharge air temperature of 17° C. would be considered 94% efficient (16/17).

At 204, the controller determines if a pressure limit has been reached. The controller 40 may adjust the fluid pressure over a range from 100% to 10%, or vice versa. If the pressure limit is not reached, flow proceeds to 206 where the fluid pressure in adjusted (e.g., increased or decreased) and flow proceeds to 202. The steps 204 and 206 may be alternatively implemented as a shifting through a fixed range of determined fluid pump(s) 22 speeds (e.g. increments of 10%, between 10% to 100%) of the fluid pump(s) 22 rated nominal speeds, until the whole range has been covered. This results in measuring a range of terminal unit efficiencies for each terminal unit over the range of fluid pressures.

Figure 3:
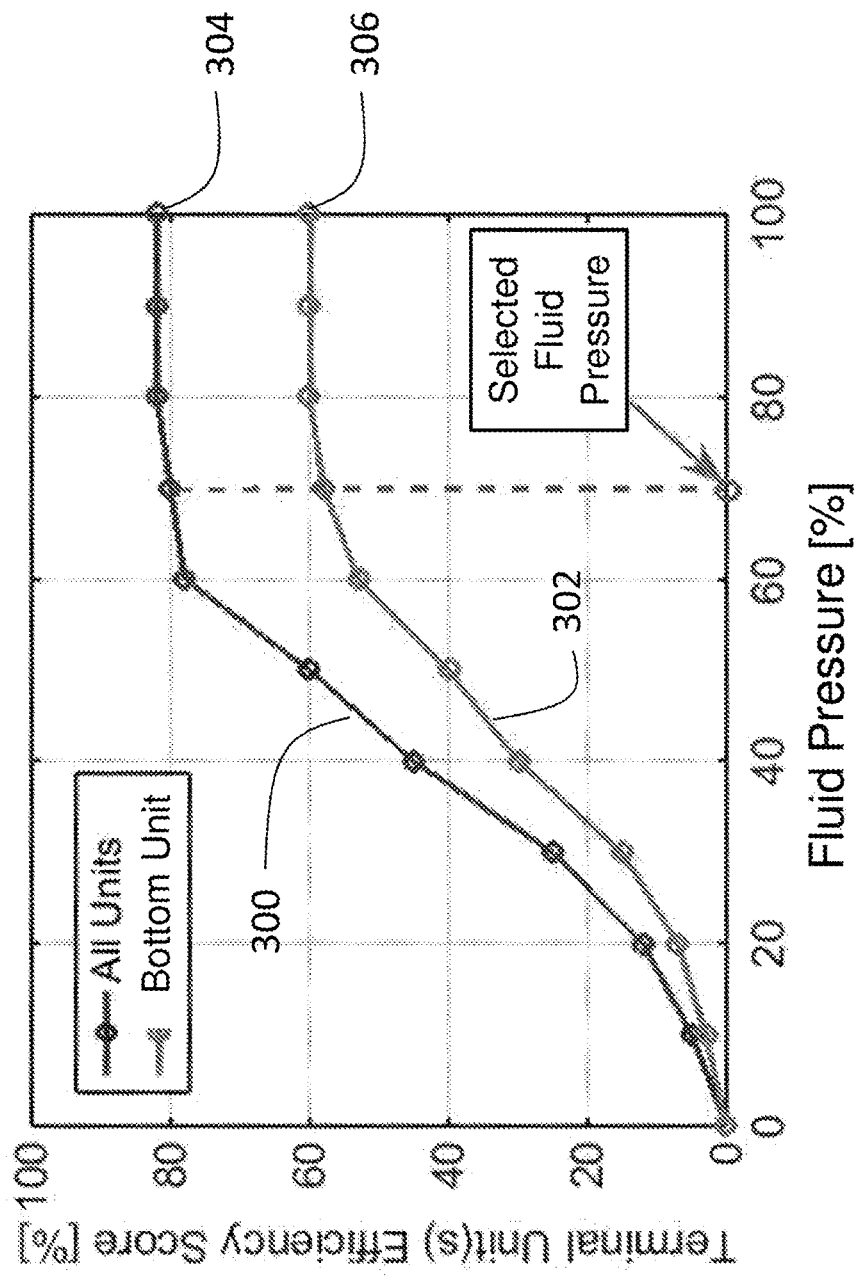
FIG. 3 is a graph of terminal unit(s) efficiency versus fluid pressure in an exemplary embodiment.

If at 204 the pressure limit has been reached, or the whole range of fluid pump(s) 22 speeds has been covered, flow proceeds to 208 where the controller 40 determines a range of combined terminal unit efficiencies over the range of fluid pressures (using all the measurements acquired thus far since the beginning of the process). The combined terminal unit efficiency may be an average (optionally a weighted average) of all the individual terminal unit efficiencies at each fluid pressure. Referring to FIG. 3, the combined terminal unit efficiency at each fluid pressure is represented by plot 300. The combined terminal unit efficiency reaches a maximum at 100% fluid pressure, referred to as the combined terminal unit efficiency limit 304. The combined terminal unit efficiency limit 304 need not be determined at 100% pressure, but rather may be determined at some other pressure (e.g., a maximum pressure or some other upper pressure value).

At 210, the controller 40 identifies the terminal unit 30 providing a bottom terminal unit efficiency. Referring to FIG. 3, the terminal unit with the bottom efficiency is represented by plot 302. The bottom terminal unit efficiency may be associated with the terminal unit 38 having the lowest efficiency at 100% fluid pressure, depicted as a bottom terminal unit efficiency limit 306. Alternatively, the bottom terminal unit efficiency may be associated with the terminal unit 30 having the farthest distance from the combined terminal unit efficiency (e.g., distance between plots 300 and 302). In yet another embodiment, the bottom terminal unit efficiency may be associated with the terminal unit 30 having the least amount of area under a plot of fluid pressure versus efficiency (e.g., integral of plot 302). The bottom terminal unit efficiency may be associated with the terminal unit 30 having a poor efficiency, including but not limited to the worst or lowest performing terminal unit.

At 212, the controller 40 selects the lowest fluid pressure at which at least one of (i) the combined terminal unit efficiency is within a threshold of the combined terminal unit efficiency limit 304 and (ii) the bottom terminal unit efficiency is within a threshold of the bottom terminal unit efficiency limit 306. The controller 40 may also select the lowest fluid pressure at which both (i) the combined terminal unit efficiency is within a threshold of the combined terminal unit efficiency limit 304 and (ii) the bottom terminal unit efficiency is within a threshold of the bottom terminal unit efficiency limit 306. In exemplary embodiments, the threshold for both determinations is 5%, but it is understood that a different threshold may be used for each evaluation. Referring to FIG. 3, the fluid pressure is selected at a 70% value, where both plots 300 and 302 are within 5% of their respective limits 304 and 306.

Embodiments select a fluid pressure at the lowest fluid pressure that does not lead to a significant efficiency decrease of either or both the combined terminal unit efficiency and the bottom terminal unit efficiency. Embodiments reduce commissioning costs by automating selection of a suitable operating fluid pressure. Operating costs are reduced by not wasting energy in unnecessary excessive fluid pressure. Maintenance costs are also reduced by lowering wear and tear of the fluid loop components (e.g., pumps).

While the disclosure has been described in detail in connection with only a limited number of embodiments, it should be readily understood that the invention is not limited to such disclosed embodiments. Rather, the disclosure can be modified to incorporate any number of variations, alterations, substitutions or equivalent arrangements not heretofore described, but which are commensurate with the scope of the invention. Additionally, while various embodiments have been described, it is to be understood that aspects of the invention may include only some of the described embodiments. Accordingly, the disclosure is not to be seen as limited by the foregoing description, but is only limited by the scope of the appended claims.

What is claimed is:

1. A method for selecting a fluid pressure of a fluid supplied to a plurality of terminal units in a climate control system, the method comprising:
    adjusting the fluid pressure over a range of fluid pressures;
    determining a range of terminal unit efficiencies for each terminal unit over the range of fluid pressures;
    determining a range of combined terminal unit efficiencies over the range of fluid pressures;
    identifying a range of bottom terminal unit efficiencies over the range of fluid pressures; and
    selecting a selected fluid pressure at which at least one of (i) a combined terminal unit efficiency is within a first threshold of a combined terminal unit efficiency limit and (ii) a bottom terminal unit efficiency is within a second threshold of a bottom terminal unit efficiency limit.

2. The method of claim 1 wherein:
the first threshold and second threshold are equal.

3. The method of claim 1 wherein:
the combined terminal unit efficiency limit corresponds to the combined terminal unit efficiency at an other pressure.

4. The method of claim 3 wherein:
the other pressure is a maximum fluid pressure for the climate control system.

5. The method of claim 3 wherein:
the bottom terminal unit efficiency limit corresponds to the bottom terminal unit efficiency at the other pressure.

6. The method of claim 5 wherein:
the other pressure is a maximum fluid pressure for the climate control system.

7. The method of claim 1 wherein:
the combined terminal unit efficiency is determined by averaging terminal unit efficiencies of the plurality of terminal units yielding a range of combined terminal unit efficiencies over the range of fluid pressures.

8. The method of claim 1 wherein:
the bottom terminal unit efficiency is associated with the lowest performing terminal unit.

9. The method of claim 1 wherein:
wherein the selecting comprises selecting the selected fluid pressure at which both (i) the combined terminal unit efficiency is within a first threshold of a combined terminal unit efficiency limit and (ii) the bottom terminal unit efficiency is within a second threshold of a bottom terminal unit efficiency limit.

10. A climate control system comprising:
a conditioning system having a heat exchanger;
a terminal unit system including a pump for circulating a fluid through the heat exchanger and to a plurality of terminal units; and
a controller configured to select a fluid pressure of the fluid supplied to the plurality of terminal units, the controller configured to execute operations comprising:
adjusting the fluid pressure over a range over fluid pressures;
determining a range of terminal unit efficiencies for each terminal unit over the range of fluid pressures;
determining a range of combined terminal unit efficiencies over the range of fluid pressures;
identifying a range of bottom terminal unit efficiencies over the range of fluid pressures; and
selecting a selected fluid pressure at which at least one of (i) a combined terminal unit efficiency is within a first threshold of a combined terminal unit efficiency limit and (ii) a bottom terminal unit efficiency is within a second threshold of a bottom terminal unit efficiency limit.

11. The climate control system of claim 10 wherein:
the first threshold and second threshold are equal.

12. The climate control system of claim 10 wherein:
the combined terminal unit efficiency limit corresponds to the combined terminal unit efficiency at an other pressure.

13. The climate control system of claim 12 wherein:
the other pressure is a maximum fluid pressure for the climate control system.

14. The climate control system of claim 12 wherein:
the bottom terminal unit efficiency limit corresponds to the bottom terminal unit efficiency at the other pressure.

15. The climate control system of claim 14 wherein:
the other pressure is a maximum fluid pressure for the climate control system.

16. The climate control system of claim 10 wherein:
the combined terminal unit efficiency is determined by averaging terminal unit efficiencies of the plurality of terminal units yielding a range of combined terminal unit efficiencies over the range of fluid pressures.

17. The method of claim 10 wherein:
the bottom terminal unit efficiency is associated with the lowest performing terminal unit.

18. The climate control system of claim 10 wherein:
wherein the selecting comprises selecting the selected fluid pressure at which both (i) the combined terminal unit efficiency is within a first threshold of a combined terminal unit efficiency limit and (ii) the bottom terminal unit efficiency is within a second threshold of a bottom terminal unit efficiency limit.

* * * * *